US011801817B2

(12) United States Patent
Stone et al.

(10) Patent No.: US 11,801,817 B2
(45) Date of Patent: Oct. 31, 2023

(54) VEHICLE BRAKING SYSTEM

(71) Applicant: ZF Active Safety US Inc., Livonia, MI (US)

(72) Inventors: Nick Stone, Brighton, MI (US); Joseph Zeoli, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 330 days.

(21) Appl. No.: 17/192,061

(22) Filed: Mar. 4, 2021

(65) Prior Publication Data

US 2022/0281428 A1 Sep. 8, 2022

(51) Int. Cl.
*B60T 13/68* (2006.01)
*B60T 15/02* (2006.01)
*B60T 13/14* (2006.01)
*B60T 8/40* (2006.01)
*B60T 13/62* (2006.01)

(52) U.S. Cl.
CPC .......... *B60T 13/686* (2013.01); *B60T 13/145* (2013.01); *B60T 15/028* (2013.01); *B60T 8/4081* (2013.01); *B60T 13/62* (2013.01); *B60T 2270/402* (2013.01); *B60T 2270/404* (2013.01); *B60T 2270/82* (2013.01)

(58) Field of Classification Search
CPC .... B60T 13/686; B60T 13/745; B60T 15/028; B60T 13/145
See application file for complete search history.

(56) References Cited

U.S. PATENT DOCUMENTS

| | | | | |
|---|---|---|---|---|
| 2016/0207514 | A1* | 7/2016 | Knechtges | B60T 7/042 |
| 2017/0217418 | A1* | 8/2017 | Ganzel | B60T 8/4086 |
| 2017/0361825 | A1* | 12/2017 | Drumm | B60T 8/4081 |
| 2018/0126971 | A1* | 5/2018 | Leiber | B60T 8/4081 |
| 2018/0148031 | A1* | 5/2018 | Knechtges | B60T 13/686 |
| 2018/0194337 | A1* | 7/2018 | Leiber | B60T 7/04 |
| 2019/0100189 | A1* | 4/2019 | Ganzel | B60T 7/042 |
| 2019/0241167 | A1* | 8/2019 | Peichl | B60T 13/161 |
| 2019/0351886 | A1* | 11/2019 | Besier | B60T 13/741 |
| 2020/0139949 | A1* | 5/2020 | Dolmaya | B60T 8/4081 |
| 2020/0189546 | A1* | 6/2020 | Dolmaya | B60T 13/686 |

(Continued)

FOREIGN PATENT DOCUMENTS

| | | |
|---|---|---|
| DE | 102017000472 A1 | 7/2018 |
| DE | 102019207088 A1 * 11/2020 | .............. B60T 11/26 |

OTHER PUBLICATIONS

German Search Report for corresponding German Application Serial No. 10 2022 201 795.1, dated Jan. 20, 2023, pp. 1-8.

*Primary Examiner* — Bradley T King
(74) *Attorney, Agent, or Firm* — Robert James Harwood

(57) ABSTRACT

A braking system for a vehicle including front and rear wheels having wheel brakes includes a fluid displacement mechanism for supplying brake fluid to at least one of the wheel brakes. The fluid displacement mechanism includes a piston having a first position prior to braking and a second position for applying braking. A fluid accumulator is in fluid communication with the fluid displacement mechanism and stores brake fluid. A valve is in fluid communication with the fluid displacement mechanism and the accumulator and is configured to be closed while the piston moves from the second position towards the first position to prevent depletion of the accumulator.

2 Claims, 6 Drawing Sheets

(56) References Cited

U.S. PATENT DOCUMENTS

| | | | |
|---|---|---|---|
| 2020/0207320 A1* | 7/2020 | Plewnia | B60T 13/58 |
| 2020/0207321 A1* | 7/2020 | Plewnia | B60T 13/148 |
| 2020/0216052 A1* | 7/2020 | Campau | B60T 13/745 |
| 2020/0339096 A1* | 10/2020 | Timm | B60T 13/686 |
| 2020/0361439 A1* | 11/2020 | Neu | B60T 13/146 |
| 2021/0031741 A1* | 2/2021 | Alford | B60T 13/662 |
| 2021/0179044 A1* | 6/2021 | Passmann | B60T 7/042 |
| 2021/0179051 A1* | 6/2021 | Alford | B60T 13/142 |
| 2022/0135010 A1* | 5/2022 | Leiber | B60T 13/686 303/3 |
| 2022/0203949 A1* | 6/2022 | Kim | B60T 8/4081 |
| 2023/0001908 A1* | 1/2023 | Einig | B60T 17/222 |
| 2023/0047015 A1* | 2/2023 | Ganzel | B60T 8/409 |

\* cited by examiner

VEHICLE BRAKING SYSTEM

TECHNICAL FIELD

The present invention relates generally to vehicle braking systems, and specifically to a system for mitigating accumulator volume loss in a secondary braking module.

BACKGROUND

In vehicles equipped with integrated braking control, there is a constant relationship between the position of the fluid displacement mechanism, e.g., a double acting piston (DAP) or single acting piston, and system pressure during normal braking. By the end of certain slip control events, the relationship between DAP position and system pressure has changed due to system pressure release during the event. As a result, the pressure in the DAP chamber can drop below atmospheric pressure prior to the DAP returning to its home position. This vacuum has the potential to partially deplete the fluid accumulator in the secondary brake module (SBM) of vehicles so equipped.

SUMMARY

In one example, a braking system for a vehicle including front and rear wheels having wheel brakes includes a fluid displacement mechanism for supplying brake fluid to at least one of the wheel brakes. The fluid displacement mechanism includes a piston having a first position prior to braking and a second position for applying braking. A fluid accumulator is in fluid communication with the fluid displacement mechanism and stores brake fluid at atmospheric pressure. A valve is in fluid communication with the fluid displacement mechanism and the accumulator and is configured to be closed while the piston moves from the second position towards the first position to prevent depletion of the accumulator.

In another example, a braking system for a vehicle including front and rear wheels having wheel brakes includes a fluid displacement mechanism for supplying brake fluid to at least one of the wheel brakes. The fluid displacement mechanism includes a piston having a first position prior to applying braking and a second position for applying braking. A fluid accumulator is in fluid communication with the fluid displacement mechanism and stores brake fluid at atmospheric pressure. A relief valve fluidly connects one of the wheel brakes to the accumulator. A normally open solenoid valve is connected in parallel with the relief valve and establishes a reverse flow path from the accumulator, through the relief valve, through the valve, and back to the fluid displacement mechanism. The solenoid valve is actuated closed while the piston moves from the second position towards the first position to close the reverse flow path and prevent depletion of the accumulator.

In another example, a braking system for a vehicle including front and rear wheels having wheel brakes includes a fluid displacement mechanism for supplying brake fluid to at least one of the wheel brakes. The fluid displacement mechanism includes a piston and a pair of chambers on opposite sides thereof for receiving brake fluid. The piston has a first position prior to applying braking and a second position for applying braking. A fluid accumulator is in fluid communication with the fluid displacement mechanism and stores brake fluid at atmospheric pressure. A relief valve fluidly connects one of the wheel brakes to the accumulator. A normally open solenoid valve is provided in a loop between the chambers of the double acting piston assembly and provides fluid communication between the chambers. A normally closed solenoid valve is connected in parallel with the normally open solenoid valve in the loop. The normally closed solenoid valve is closed while the piston moves from the second position towards the first position such that a vacuum generated in one of the chambers does not deplete the accumulator.

Other objects and advantages and a fuller understanding of the invention will be had from the following detailed description and the accompanying drawings.

DETAILED DESCRIPTION

Figure 1:
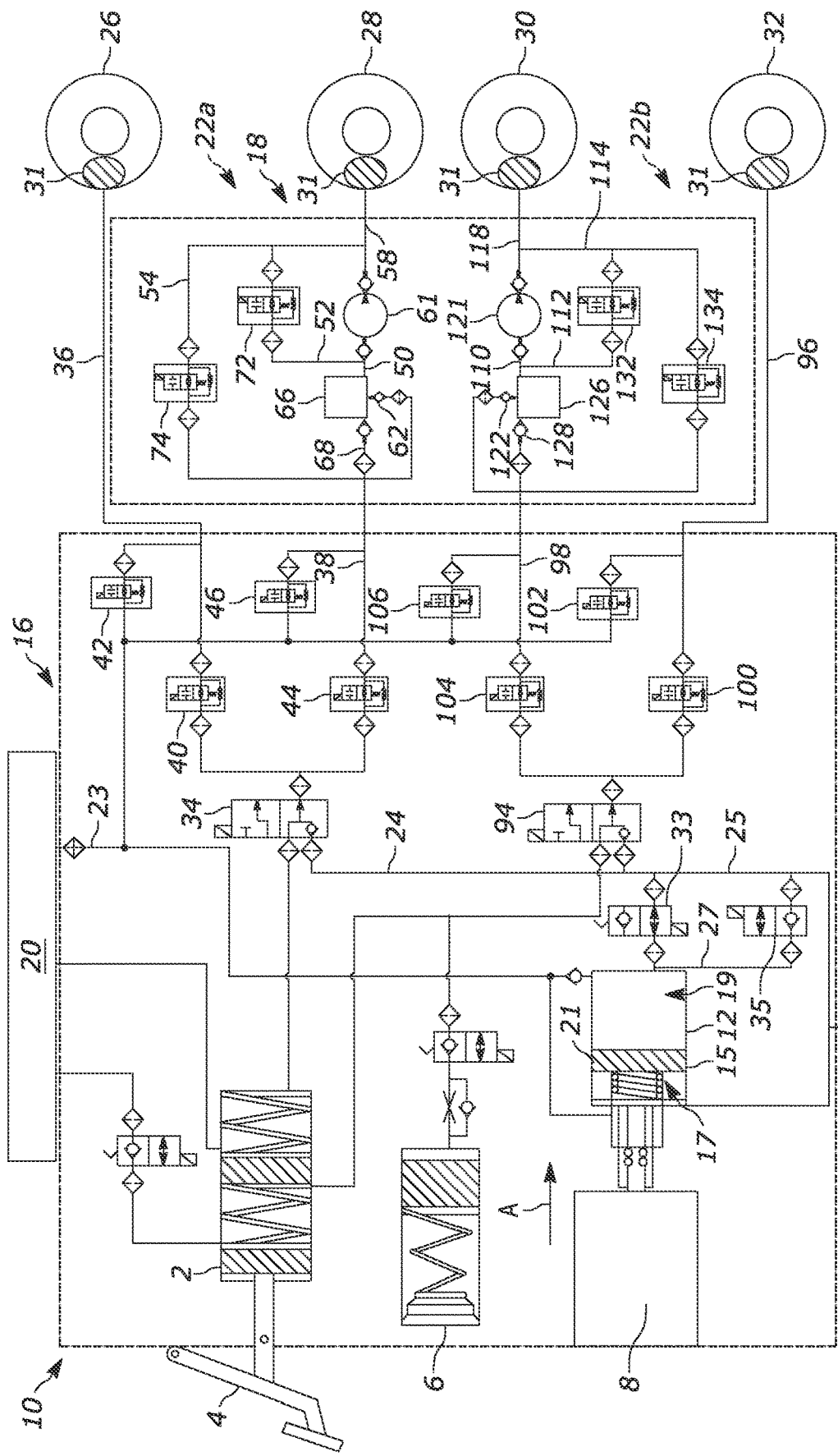
FIG. 1 is a schematic illustration of an example vehicle braking system.

The present invention relates generally to vehicle braking systems, and specifically to a system for mitigating accumulator volume loss in secondary braking. FIG. 1 illustrates an example braking system 10 for a vehicle in accordance with an aspect of the invention. The braking system 10 includes a primary braking module (PBM) 16 and a secondary braking module (SBM) 18 configured as a backup system in case of failure of the PBM. As will be described, the PBM 16 distributes pressurized brake fluid to ultimately apply braking to the vehicle.

The PBM 16 includes a fluid displacement mechanism 12. As shown, the fluid displacement mechanism is a double acting piston (DAP) assembly, although a single acting piston assembly (not shown) is also contemplated. The DAP assembly 12 cooperates with a motor 8 to collectively form a power transfer unit (PTU) that pressurizes brake fluid in response to manual depression of a brake pedal 4 by the vehicle operator or autonomously when the vehicle has no operator. Moving the brake pedal 4 also directly drives a master cylinder 2 to allow for direct brake application in a known manner. A pedal simulator 6 can help provide feedback to the operator during depression of the pedal 4.

The DAP assembly 12 includes a housing 15 in which a linearly movable piston 21 is provided. The motor 8 drives the piston 21 back and forth within the housing 15. The piston 21 divides the interior of the housing 15 into a pair of chambers 17, 19. The chamber 17 is fluidly connected to a conduit 23. The chamber 19 is fluidly connected to a conduit 27. A reservoir 20 is connected to the conduit 23 and holds a supply of brake fluid at atmospheric pressure. The reservoir 20 is in bidirectional fluid communication with the master cylinder 2.

A pair of valves 33, 35 is provided in a parallel relationship with one another between the conduit 25 and the conduit 27. The valve 33 is a normally open (NO) solenoid-actuated 2-position, 2-way valve. The valve 35 is a normally closed (NC) solenoid-actuated 2-position, 2-way valve. The valves 33, 35 provide fluid communication between the chambers 17, 19 of the DAP assembly 12 and direct flow between the chambers when the piston 21 moves within the housing 15. In other words, the valves 33, 35 help form a loop between the chambers 17, 19.

The conduit 27 branches into a pair of conduits 24, 25 that are respectively associated with separate brake circuits 22a, 22b. The braking system 10 is preferably configured as a split system, with brake circuit 22a controlling a first pair of wheel brakes 26, 28 and the brake circuit 22b controlling a second pair of wheels brakes 30, 32.

In one example, the wheel brake 26 corresponds with the left rear (LR) wheel and the wheel brake 28 corresponds with the right front (RF) wheel. The wheel brake 30 corresponds with the right rear (RR) wheel and the wheel brake 32 corresponds with the left front (LF) wheel. The braking system 10 is capable of providing anti-lock braking system (ABS) control, vehicle stability control (VSC), and traction control (TC) to combinations of the four wheel brakes 26, 28, 30, 32 in known manners. Each wheel brake 26, 28, 30, 32 includes a caliper 31.

In the brake circuit 22a, a three way valve 34 helps split the main conduit 24 into two conduits 36, 38. In one instance, the three way valve 34 selects between two input fluid sources for applying the brakes. More specifically, the three-way valve 34 is energized to direct brake fluid from the PTU to the wheel brakes 26, 28, 30, 32 during normal braking. The three way valve 34 can be/remain de-activated during a failed power event to direct brake fluid from the master cylinder 2 to the wheel brakes 26, 28, 30, 32.

A NO, solenoid-actuated 2-position, 2-way ABS isolation (ABS ISO) valve 40 is located in the conduit 36 between the DAP assembly 12 and the LR wheel brake 26. The ABS ISO valve 40 has a controllable, NO orifice in parallel with a check valve. The NO orifice allows fluid to flow between the DAP assembly 12 and the LR wheel brake 26 while the check valve only allows fluid to flow from the LR wheel brake to the DAP assembly. A dump valve 42 can be provided in the conduit 36 and includes a controllable, NO orifice in parallel with a check valve. The NO orifice allows fluid to flow between the conduit 36 and the reservoir 20 while the check valve only allows fluid to flow from the reservoir to the conduit 36. The dump valve 42 can be used to release pressure during slip control events.

A NO, solenoid-actuated 2-position, 2-way ABS ISO valve 44 is located in the conduit 38 and selectively allows fluid to flow between the conduit 34 and the conduit 38. The ABS ISO valve 44 has a controllable, NO orifice in parallel with a check valve. The NO orifice allows fluid to flow between the conduit 38 and the DAP assembly 12 while the check valve only allows fluid to flow from the conduit to the DAP assembly. A dump valve 46 can be provided in the conduit 38 and includes a controllable, NO orifice in parallel with a check valve. The NO orifice allows fluid to flow between the conduit 38 and the reservoir 20 while the check valve only allows fluid to flow from the reservoir to the conduit 38.

The conduit 38 branches into conduits 50, 52, 54. The conduits 50, 52, 54 recombine at a conduit 58 connected to the RF wheel brake 28. A one-way valve 62 is provided between the conduits 38, 50. The one-way valve 62 allows flow from the conduit 38 to the conduit 50 but prevents flow in the opposite direction. A pump 61 is provided between the conduits 50, 58 and driven by a motor (not shown). It will be appreciated that multiple pumps can be provided between the conduits 50, 58 and arranged in parallel with one another. (not shown).

An accumulator, such as a boost storage accumulator (BSA) 66 is provided in the conduit 52. A one-way valve 68 is provided in the conduit 52 between the BSA 66 and the conduit 38. The one-way valve 68 allows flow from the conduit 38 to the BSA 66 but prevents flow in the opposite direction.

A NO, solenoid-actuated 2-position, 2-way relief valve 72 is located in the conduit 52 between the RF wheel brake 28 and the BSA 66. The relief valve 72 has a controllable, NO orifice in parallel with a check valve, which allows fluid to flow from the BSA 66 towards the RF wheel brake 28 but prevents flow in the opposite direction. The relief valve 72 helps to maintain the caliper 31 of the RF wheel brake 28 at/below a predetermined level.

A NO, solenoid-actuated 2-position, 2-way bypass valve 74 is located in the conduit 54 between the RF wheel brake 28 and the conduit 38 and allows fluid flow from the PBM 16 to have a more free-flowing path through the SBM 18. The bypass valve 74 has a controllable, NO orifice in parallel with a check valve. The NO orifice allows fluid to flow between the conduit 38 and the RF wheel brake 28 while the check valve only allows fluid to flow from the conduit 38 to the RF wheel brake. The bypass valve 74 is connected in parallel with the relief valve 72.

In the brake circuit 22b, a three way valve 64 helps split the main conduit 25 into two conduits 96, 98. Similar to the three way valve 34, the three way valve 64 selects between the PTU and master cylinder 2 for applying the brakes depending on the aforementioned vehicle conditions.

A NO, solenoid-actuated 2-position, 2-way ABS ISO valve 100 is located in the conduit 96 between the DAP assembly 12 and the RR wheel brake 30. The ABS ISO valve 100 has a controllable, NO orifice in parallel with a check valve. The NO orifice allows fluid to flow between the DAP assembly 12 and the RR wheel brake 30 while the check valve only allows fluid to flow from the RR wheel brake to the DAP assembly. A dump valve 102 can be provided in the conduit 96 and includes a controllable, NC orifice in parallel with a check valve. The NC orifice allows fluid to flow between the conduit 96 and the reservoir 20 while the check valve only allows fluid to flow from the reservoir to the conduit 96.

A NO, solenoid-actuated 2-position, 2-way ABS ISO valve 104 is located in the conduit 98 and selectively allows fluid to flow between the conduit 94 and the conduit 98. The ABS ISO valve 104 has a controllable, NO orifice in parallel with a check valve. The NO orifice allows fluid to flow between the conduit 98 and the DAP assembly 12 while the check valve only allows fluid to flow from the conduit to the DAP assembly. A dump valve 106 can be provided in the conduit 98 and includes a controllable, NC orifice in parallel with a check valve. The NC orifice allows fluid to flow between the conduit 98 and the reservoir 20 while the check valve only allows fluid to flow from the reservoir to the conduit 98. It will be appreciated that one or more (including all) of the check valves in parallel with the dump valves 42, 46, 102, 106 can be omitted depending on the application.

The conduit 98 branches into conduits 110, 112, 114. The conduits 110, 112, 114 recombine at a conduit 118 connected to the LR wheel brake 32. A one-way valve 122 is provided between the conduits 98, 110. The one-way valve 122 allows flow from the conduit 98 to the conduit 110 but prevents flow in the opposite direction. A pump 121 is provided between the conduits 110, 118 and driven by a motor (not shown). It will be appreciated that multiple pumps can be provided between the conduits 110, 118 and arranged in parallel with one another. (not shown).

A BSA 126 is provided in the conduit 112. A one-way valve 128 is provided in the conduit 112 between the BSA 126 and the conduit 98. The one-way valve 128 allows flow from the conduit 98 to the BSA 126 but prevents flow in the opposite direction.

A NO, solenoid-actuated 2-position, 2-way relief valve 132 is located in the conduit 112 between the LF wheel brake 32 and the BSA 126. The relief valve 132 has a controllable, NO orifice in parallel with a check valve, which allows fluid to flow from the BSA 126 towards the LF wheel brake 32 but prevents flow in the opposite direction. The relief valve 132 helps to maintain the caliper 31 of the LF wheel brake 32 at/below a predetermined level.

A NO, solenoid-actuated 2-position, 2-way bypass valve 134 is located in the conduit 114 between the LF wheel brake 32 and the conduit 98 and allows fluid flow from the PBM 16 to have a more free flowing path through the SBM 18. The bypass valve 134 has a controllable, NO orifice in parallel with a check valve. The NO orifice allows fluid to flow between the conduit 98 and the LF wheel brake 32 while the check valve only allows fluid to flow from the conduit 98 to the LF wheel brake. The bypass valve 134 is connected in parallel with the relief valve 132.

During normal braking, the DAP assembly 12 is actuated (either in response to manual brake pedal 4 operation or autonomously) to pressurize brake fluid therein. More specifically, the piston 21 is advanced within the housing 15 from a first/initial position to a second/extended position. As shown, the piston 21 advances in the left-to-right direction shown at A in FIG. 1.

As a result, in the circuit 22*a* the pressurized brake fluid travels through conduits 24, 36, through the open ABS ISO valve 40, and into the LR wheel brake 26. Pressurized brake fluid also travels through conduits 24, 38, through the open ABS ISO valve 44, through the open bypass valve 74, into the conduit 58, and into the RF wheel brake 28. The valves 40, 72, 74 can be actuated closed to maintain braking pressure at the wheel brakes 26, 28.

At the same time, in the circuit 22*b*, pressurized brake fluid travels through the conduits 25, 96, through the open ABS ISO valve 104, and into the RR wheel brake 30. Pressurized brake fluid also travels through conduits 25, 96, through the open ABS ISO valve 104, through the open bypass valve 114, into the conduit 118, and into the LF wheel brake 32. The valves 100, 132, 134 can be actuated closed to maintain braking pressure at the wheel brakes 30, 32.

In situations in which the PBM 16 fails, the BSA 66 cooperates with the pump 61 by providing a readily available volume of fluid to deliver pressurized brake fluid to the RF wheel brake 28. This supply can be in lieu of or in conjunction with the pedal force of the operator, if present, via the master cylinder 2. At the same time, the BSA 126 cooperates with the pump 121 to deliver pressurized brake fluid to the LF wheel brake 32. The valves 72, 74, 132, 134 are actuated closed at this time to maintain braking pressure at the wheel brakes 28, 32. In this manner, the BSAs 66, 126 and pumps 61, 121 act as the SBM 18 to provide backup braking capability when the PBM 16 fails.

That said, the PBM 16 and SBM 18 are fluidly connected in series and, thus, during normal operation of the braking system 10 the SBM is exposed to the PBM pressure. The valves 40, 72, 74, 100, 132, 134 can all be closed or released to maintain or reduce the braking force as desired. In other words, during normal braking, nothing in the SBM 18 is activated and the valves 40, 42, 44, 46, 100, 102, 104, 106 are used in a known manner. Moreover, as noted, the BSAs 66, 126 can be utilized for ABS, VSC, TC, etc.

Figure 2:
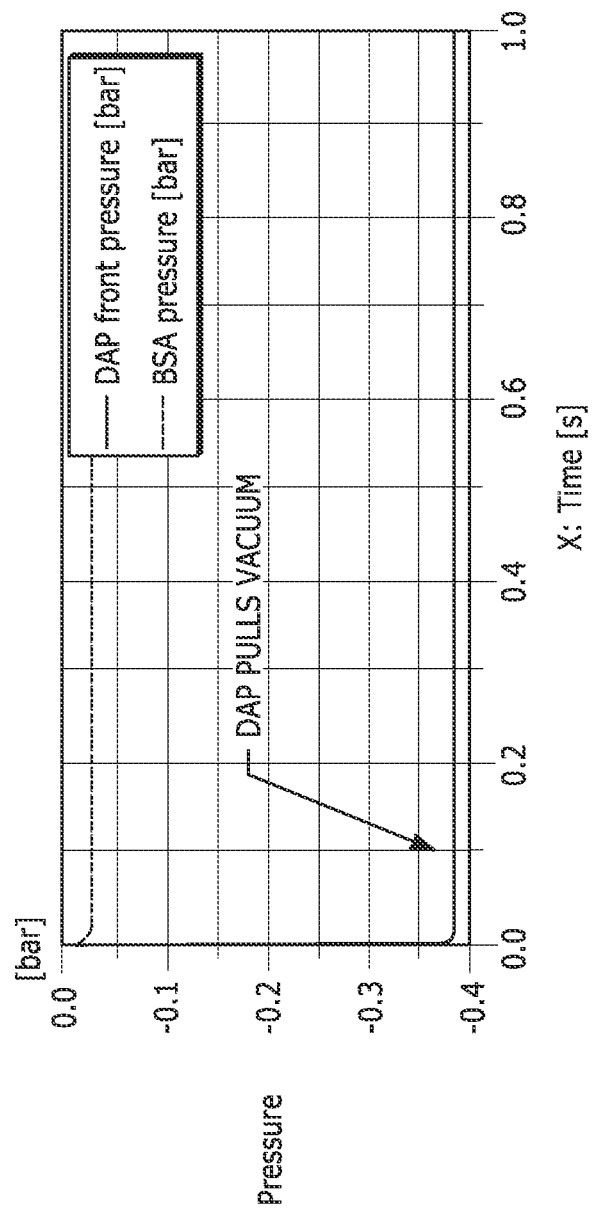
FIG. 2 is a graph illustrating pressure loss over time for a double acting piston and accumulator of an existing vehicle braking system.

When the braking operation stops, the DAP assembly 12 no longer pressurizes the brake fluid and the brake fluid returns to the chamber 19 of the DAP in a known manner. As the piston 21 returns to its initial position by moving in a direction opposite the direction A, a situation can arise in which negative/vacuum pressure is created within the housing 19 before the piston fully returns to its initial/home position (see FIG. 2). More specifically, following the use of ABS during braking, the retreating piston 21 can create vacuum pressure within the chamber 19 due to the lower volume of fluid return from the circuits 22*a*, 22*b*. The lost fluid volume can at least partially be immediately replenished by one or more of the dump check valves 42, 46, 102, 106 (when present).

Figure 3:
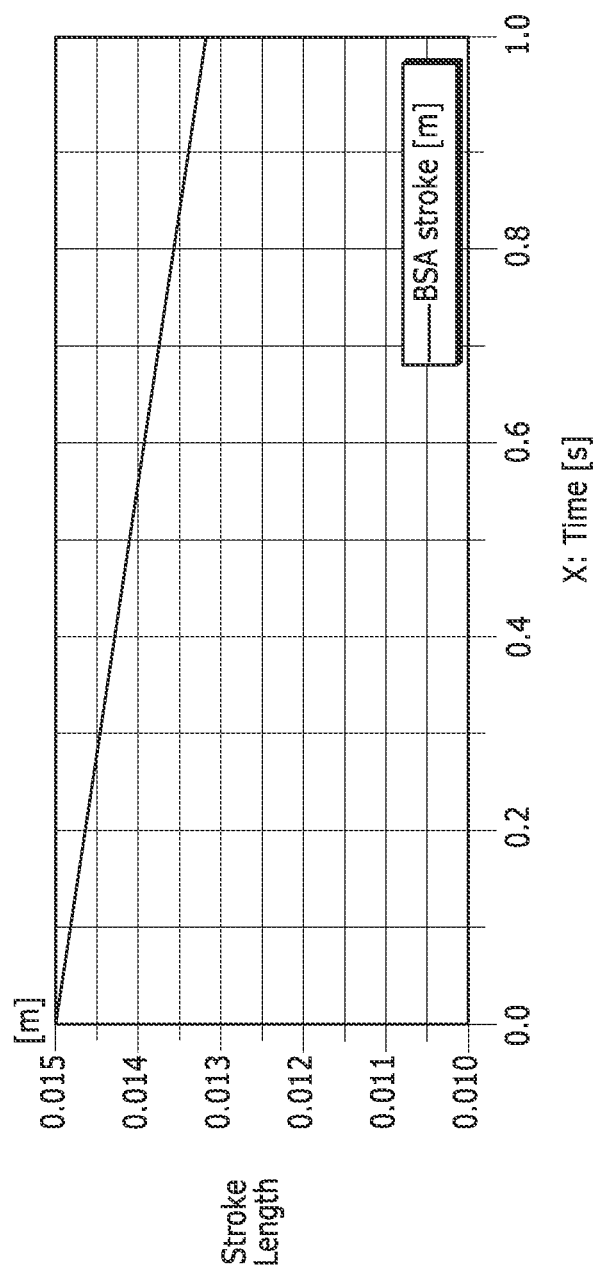
FIG. 3 is a graph illustrating stroke loss for an accumulator of an existing vehicle braking system.

Even so, this vacuum pressure has the potential to partially deplete one or both BSAs 66, 126 by lowering the pressure and stroke thereof (see also FIG. 3). When the braking system 10 is operating under normal conditions, e.g., the PBM 16 is properly functioning, any depletion of the BSAs 66, 126 can be readily replenished by the next braking situation. If, however, the PBM 16 is not functioning properly, the BSAs 66, 126 will remain depleted for the next braking situation.

With this in mind, several fluid paths exist from each BSA 66, 126 to the chamber 19. For the BSA 66, a first fluid path exists through the one-way valve 68, the ABS ISO valve 44, the three-way valve 34, and to the chamber 19. The vacuum pressure generated by the retreating piston 21, however, is insufficient to open the check valve 68. That said, a second fluid path exists from the BSA 66, through the relief valve 72, through the bypass valve 74, through the ABS ISO valve 44, and to the chamber 19.

Similarly, for the BSA 126, a first fluid path exists through the one-way valve 128, the ABS ISO valve 104, the three-way valve 94, and to chamber 19. The vacuum pressure generated by the retreating piston 21, however, is insufficient to open the check valve 128. That said, a second fluid path exists from the BSA 126, through the relief valve 132, through the bypass valve 134, through the ABS ISO valve 104, and to the chamber 19.

In accordance with the present invention, the braking system 10 is configured to close these second fluid paths and thereby prevent depletion of the BSAs 66, 126 in response to the retreating piston 21. In one example shown in FIG. 1, the NO bypass valve 74 is actuated to the closed condition during piston 21 retreat to prevent flow from the conduit 54 to the conduit 38. Consequently, any vacuum pressure generated by the retreating piston 21 is prevented from affecting/depleting the BSA 66.

Figure 4:
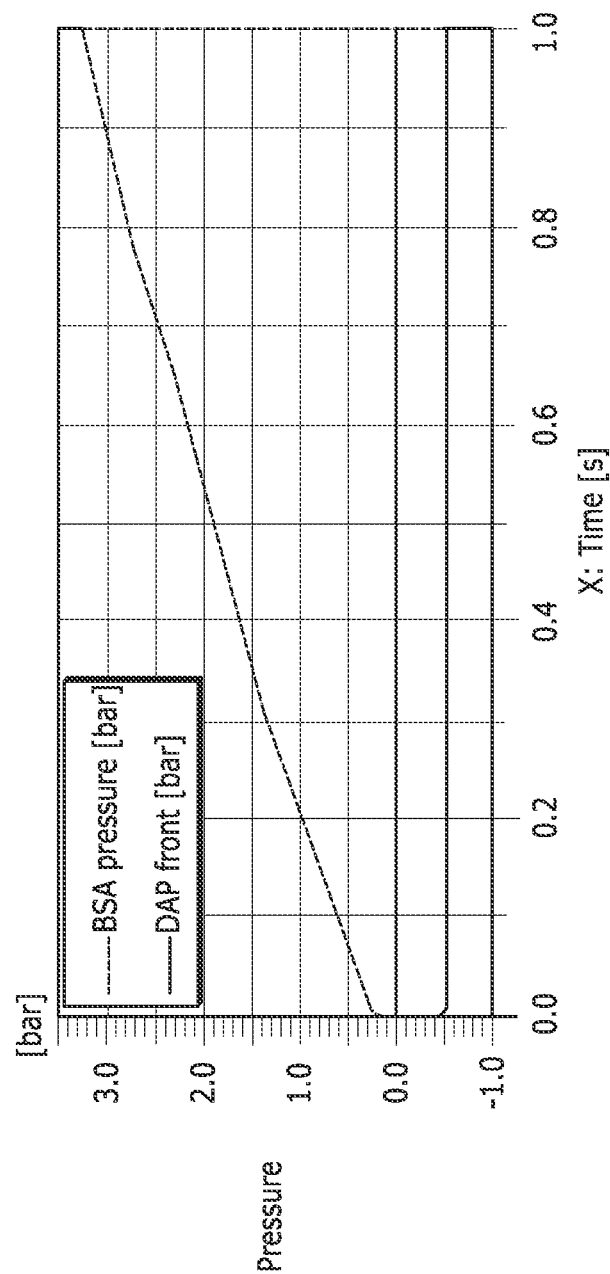
FIG. 4 is a graph illustrating pressure loss over time for a double acting piston and accumulator of the vehicle braking system of FIG. 1.
Figure 5:
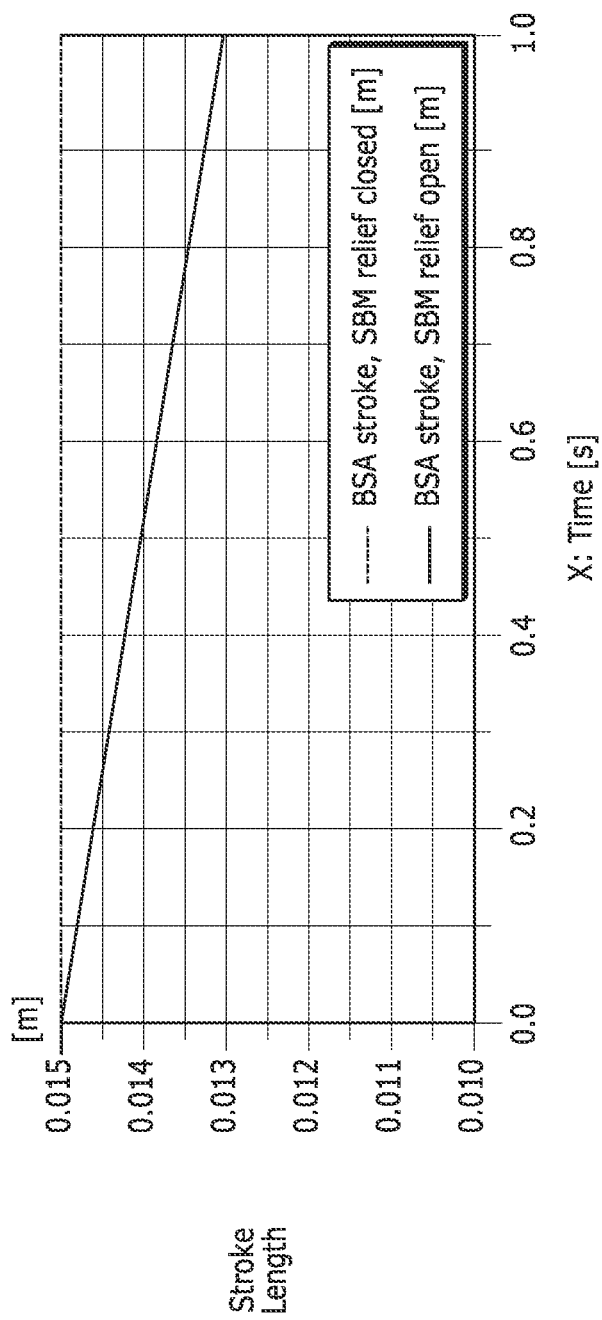
FIG. 5 is a graph illustrating stroke loss for an accumulator of the vehicle braking system of FIG. 1.

Similarly, the NO bypass valve 134 is actuated to the closed condition during piston 21 retreat to prevent flow from the conduit 114 to the conduit 98. Consequently, any vacuum pressure generated by the retreating piston 21 is prevented from affecting/depleting the BSA 126. Closing the NO bypass valves 74, 134 maintains the pressure within the BSAs 66, 126 (FIG. 4) and prevents stroke loss therein (FIG. 5). The decision to close the NO bypass valves 74, 134 can be based on pressure measurements at each chamber 17, 19 and/or monitoring the axial position of the piston 21 within the housing 15.

By closing only the NO bypass valves 74, 134, the NO, relief valves 72, 132 still fluidly connect the wheel brakes 28, 32 to the respective BSAs 66, 126. Consequently, front caliper pressure relief in the LF, RF wheel brakes 28, 32 is still possible during piston 21 return to initial position. The bypass valves 74, 134 can be opened/un-actuated once the piston 21 returns to its initial position and the chamber 19 pressure is no longer negative.

Figure 6:
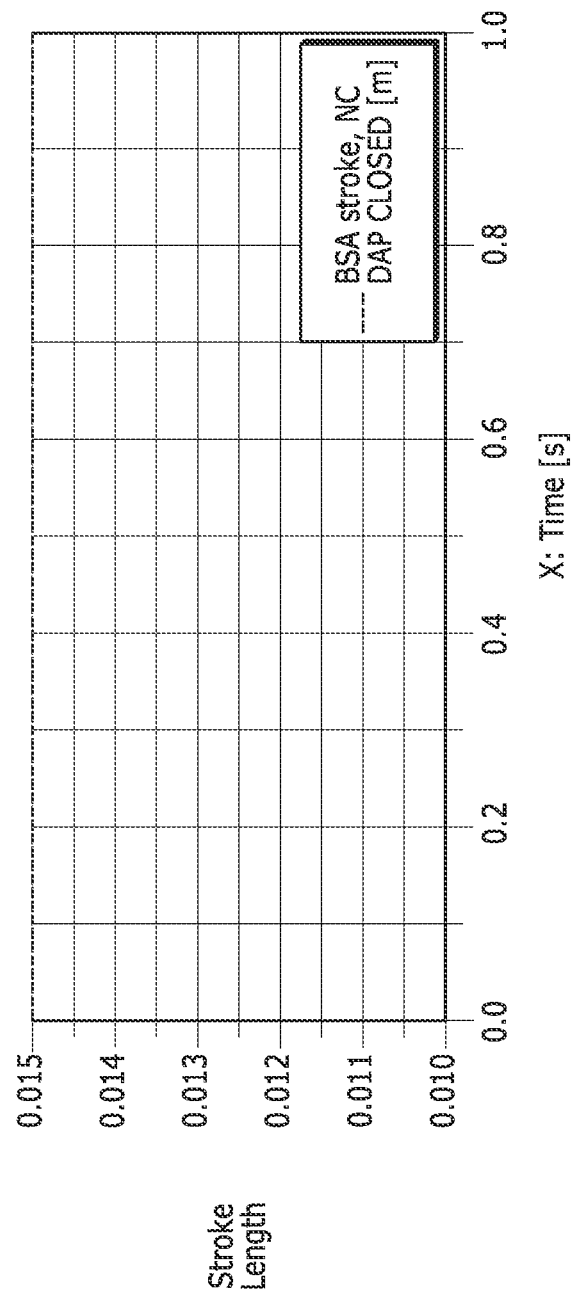
FIG. 6 is a graph illustrating stroke loss for an accumulator of the vehicle braking system of FIG. 1.

In another example configuration, the mechanism which causes depletion of BSAs 66, 126 is eliminated. More specifically, during retreat of the piston 21 to the initial position, the NC valve 35 is held closed, i.e., un-actuated, to prevent the vacuum in conduit 25, which could draw fluid from the BSAs 66, 126. In particular, as the piston 21 retreats, the volume of the chamber 15 decreases while the volume of the chamber 19 increases. Since the fluid within the chamber 15 is compressed during piston 21 retreat, actuating the NC valve 35 closed impedes the transfer of fluid from the chamber 15 to the chamber 19, thereby creating a positive pressure in conduit 25. This positive fluid pressure is sufficient to short circuit the vacuum pressure generated in the chamber 19 and thereby prevent the vacuum from affecting the BSAs 66, 126. This is evidenced by FIG. 6, which shows no stroke loss when the NC valve 35 remains closed.

In both configurations, the braking system of the present invention is advantageous in that it helps to maintain SBM accumulators at full stroke length by preventing DAP vacuum pressure from affecting the BSAs, i.e., preventing BSA depletion. This helps to ensure consistent and repeatable braking during operation of the vehicle.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A braking system for a vehicle including front and rear wheels having wheel brakes, comprising:
    a fluid displacement mechanism for supplying brake fluid to at least one of the wheel brakes, the fluid displacement mechanism including a piston having a first position prior to applying braking and a second position for applying braking;
    a fluid accumulator in fluid communication with the fluid displacement mechanism and storing brake fluid at atmospheric pressure;
    a relief valve fluidly connecting one of the wheel brakes to the accumulator; and
    a normally open solenoid valve connected in parallel with the relief valve and establishing a reverse flow path from the accumulator, through the relief valve, through the valve, and back to the fluid displacement mechanism, the solenoid valve being actuated closed while the piston moves from the second position towards the first position to close the reverse flow path and prevent depletion of the accumulator.

2. The braking system of claim 1, wherein the solenoid valve comprises a bypass valve fluidly connected to the fluid displacement mechanism, one of the wheel brakes, and the accumulator.

* * * * *